United States Patent [19]

Meredith

[11] 4,257,062
[45] Mar. 17, 1981

[54] PERSONALIZED AUDIO-VISUAL SYSTEM

[76] Inventor: Russell W. Meredith, 1126 East 7th Place, Mesa, Ariz. 85203

[21] Appl. No.: 974,307

[22] Filed: Dec. 29, 1978

[51] Int. Cl.³ .............................................. H04N 9/02
[52] U.S. Cl. ..................................................... 358/81
[58] Field of Search ....................... 358/81, 93, 58, 56, 358/88, 82

[56] References Cited

U.S. PATENT DOCUMENTS

| | | | |
|---|---|---|---|
| 2,804,500 | 8/1957 | Giacoleito | 358/82 |
| 2,955,156 | 10/1960 | Heilig | 358/88 |
| 3,050,870 | 8/1962 | Heilig . | |
| 3,062,085 | 11/1962 | Smith . | |
| 3,376,381 | 4/1968 | Ratliff . | |
| 3,474,774 | 10/1969 | Johnson et al. . | |
| 3,504,122 | 3/1970 | Ratliff . | |
| 3,550,497 | 12/1970 | Marsh . | |
| 3,604,852 | 9/1971 | Weintraub | 358/82 |
| 3,736,832 | 6/1973 | Franke et al. . | |
| 3,784,738 | 1/1974 | Natter . | |
| 4,000,679 | 1/1977 | Norman . | |
| 4,001,880 | 1/1977 | Delikat . | |
| 4,032,970 | 6/1977 | Anderson | 358/93 |
| 4,034,215 | 7/1977 | Hoshimoto . | |
| 4,128,846 | 12/1978 | Robinson, Jr. | 358/82 |

*Primary Examiner*—Richard Murray
*Attorney, Agent, or Firm*—James W. McFarland; Stuart O. Lowry

[57] ABSTRACT

An audio-visual system comprising a personalized visual display correlated with audio signals. The system comprises an audio headset operably associated with a close-fitting visor having frequency responsive electronics for controllably driving a video display to provide a video output corresponding to an audio input.

26 Claims, 8 Drawing Figures

PERSONALIZED AUDIO-VISUAL SYSTEM

BACKGROUND OF THE INVENTION

This invention relates to an audio-visual system for providing synchronous audio and visual displays. More specifically, this invention relates to a novel audio-visual system for personalized use.

Audio-visual systems are well known in the prior art of the type including light production apparatus responsive to an audio input, typically music. These systems comprise frequency responsive electronics for driving a plurality of colored lamps which illuminate a display surface with a rhythmic pattern of varying colors and light intensities. This pattern is normally synchronized with an audio output typically in the form of stereophonic music to provide a pleasing and entertaining multi-media production of colors, lights, and sound.

A variety of these audio-visual systems are available in the prior art. In one common form, these systems comprise a plurality of relatively high power projection lamps driven by frequency sensitive electronic circuitry for projecting light onto a projection screen. See, for example, U.S. Pat. No. 3,062,085. While these projection systems are well adapted for viewing by large audiences, their size, cost, and power requirements make them ill-suited for personal or private use by an individual.

Another common prior art technique comprises the use of somewhat smaller lamps driven by frequency sensitive electronic circuitry and contained within a closed housing. The lamps when illuminated project light patterns onto the rear of a translucent screen forming one wall of the housing, whereby the light patterns may be viewed from the front of the screen. See, for example, U.S. Pat. Nos. 3,474,774; 3,550,497; 3,736,832; and 4,000,679. Alternately, the light may be supplied to fiber optic spray assemblies, as in U.S. Pat. No. 4,034,215, for viewing directly, or reflection off mirrors, etc. Again, however, these projection systems may be relatively expensive, and typically require substantial power input for providing sufficient light intensity to overcome the natural lighting clutter found in most rooms. Moreover, these projection devices are designed primarily for viewing by several individuals at one time, and therefore are not ideally suited for personal or private use.

Some audio-visual systems are known in the prior art comprising personalized audio and visual components in combination. However, while these units have included audio and visual outputs, they have not provided an aesthetically pleasing and entertaining display of light patterns varying rhythmically in color and intensity in accordance with an audio signal. Instead, prior art units for personalized use have comprised relatively complicated camera and/or lens systems for imaging specific scenes or the like, such as those shown and described in U.S. Pat. Nos. 3,050,870 and 3,784,738.

The invention of this application overcomes problems and disadvantages found in the prior art by providing an improved audio-visual system for personalized or private use. Specifically, the invention comprises a relatively simple system providing a pleasing visual display of varying color and light patterns correlating with an audio signal, wherein the unit is relatively inexpensive to manufacture and easy to use, and is uniquely adapted for private use by an individual.

SUMMARY OF THE INVENTION

In accordance with the invention, a personalized audio-visual system comprises a headset including a pair of headphones with a suitable audio input such as stereophonic music or the like. The headset also includes a visor having a video display panel in close coupled relation with the wearer's face for substantially completely covering the wearer's vision. The visor carries an electronics module for receiving the audio input, and includes frequency responsive means for controlling flashing of a plurality of relatively low voltage lamps in response to the audio input. The flashing lamps are associated with color filters for supplying a video output of varying color and intensity in response to the audio input for supply to the video display panel.

In one preferred embodiment of the invention, the flashing lamps are associated with aligned bundles of fiber optic strands. Each bundle has its strands relatively randomly distributed over the face of the video display panel and received through relatively small holes therein. In this manner, the video display of varying colors and intensities may be seen as a pattern of flashing light points over the surface of the display panel.

In another preferred embodiment of the invention, the video display panel comprises a plurality of nested transparent sheets of plastic or the like including internal fractured traces or other suitable optical occlusions. The flashing lights are received within openings formed in the sheets for edge-illuminating the sheet with colored light of varying intensity. In this manner, the visual output appears to the viewer along the traces of the fractures or occlusions.

BRIEF DESCRIPTION OF THE DRAWINGS

The accompanying drawings illustrate the invention. In such drawings.

DETAILED DESCRIPTION OF THE PREFERRED EMBODIMENT

Figure 1:
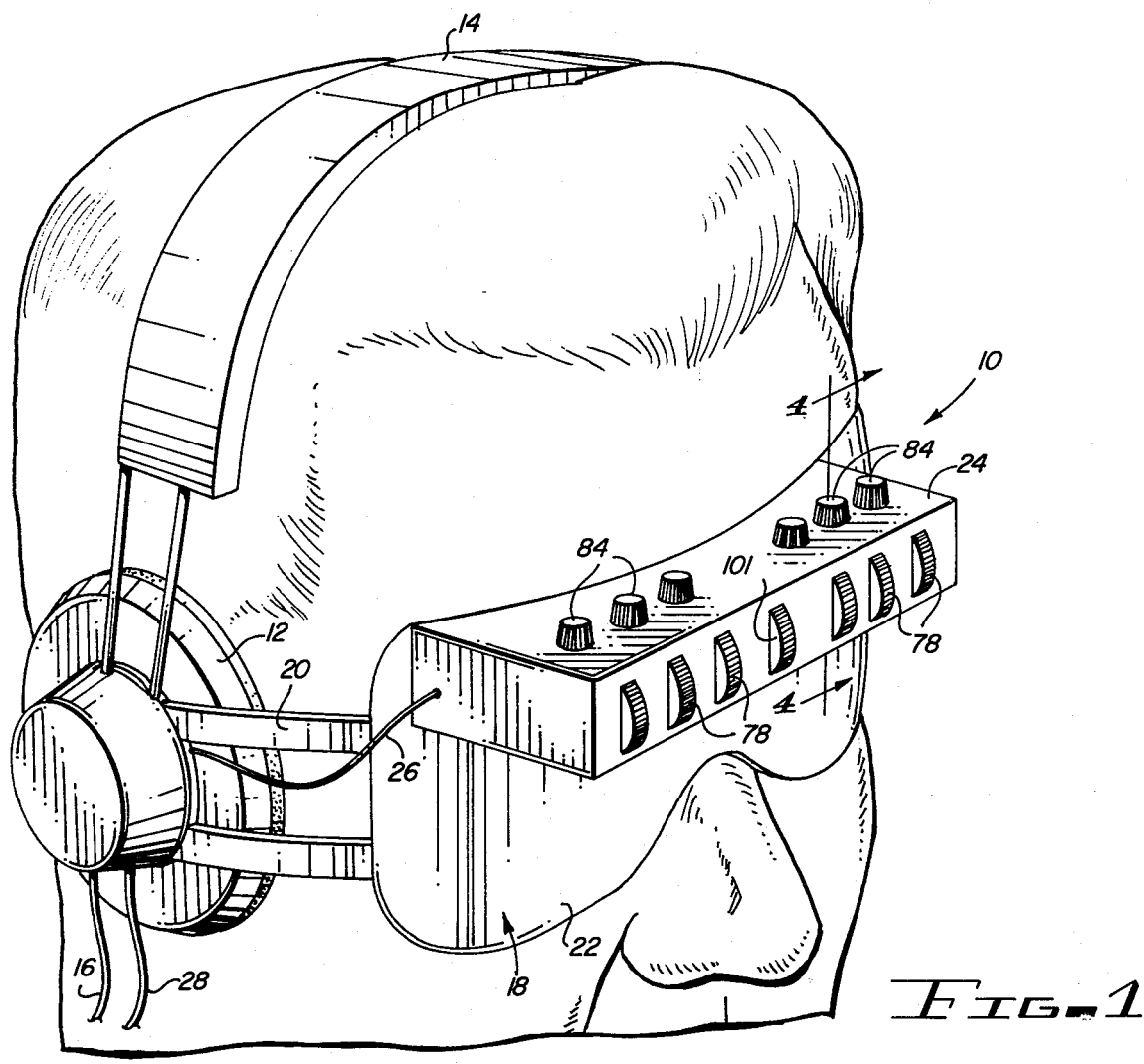
FIG. 1 is a perspective view of a personalized audio-visual system of this invention as worn by an individual.

A personalized audio-visual system 10 of this invention is shown in FIG. 1, and generally comprises a headset for mounting on the head of an individual. As shown, the headset comprises a pair of headphones 12 interconnected by a headband 14, and adapted for reception over the ears of the individual. An audio input is supplied to the headphones 12 of the headset as by a conductor cable 16. This audio input may comprise virtually any audio signal for supply to both the right and left headphones 12, with stereophonic music being contemplated in a preferred embodiment of the invention.

The headset also includes a visor assembly 18 coupled to the headphones 12 as by spring clips 20. As shown, the visor assembly 18 forms a mask-like structure received over the individual's face for substantially covering and closing off the individual's vision. More specifically, the visor assembly 18 comprises a molded visor 22 shaped to fit over the individual's face to extend generally from the individual's cheekbones to mid-brow, and generally from temple to temple. The molded visor 22 includes a video display panel (not shown in FIG. 1) which presents a video display pattern of varying lights, colors, and intensity for viewing by the individual simultaneously with listening to the audio output by means of the headphones 12. Importantly, this video display is correlated with the audio signals by means of a frequency responsive electronics module mounted in a housing 24 on the visor 22. This module is provided with the audio signal as by a multiple conductor cable 26 which also provides the module with energizing power as from a power cord 28.

Figure 2:
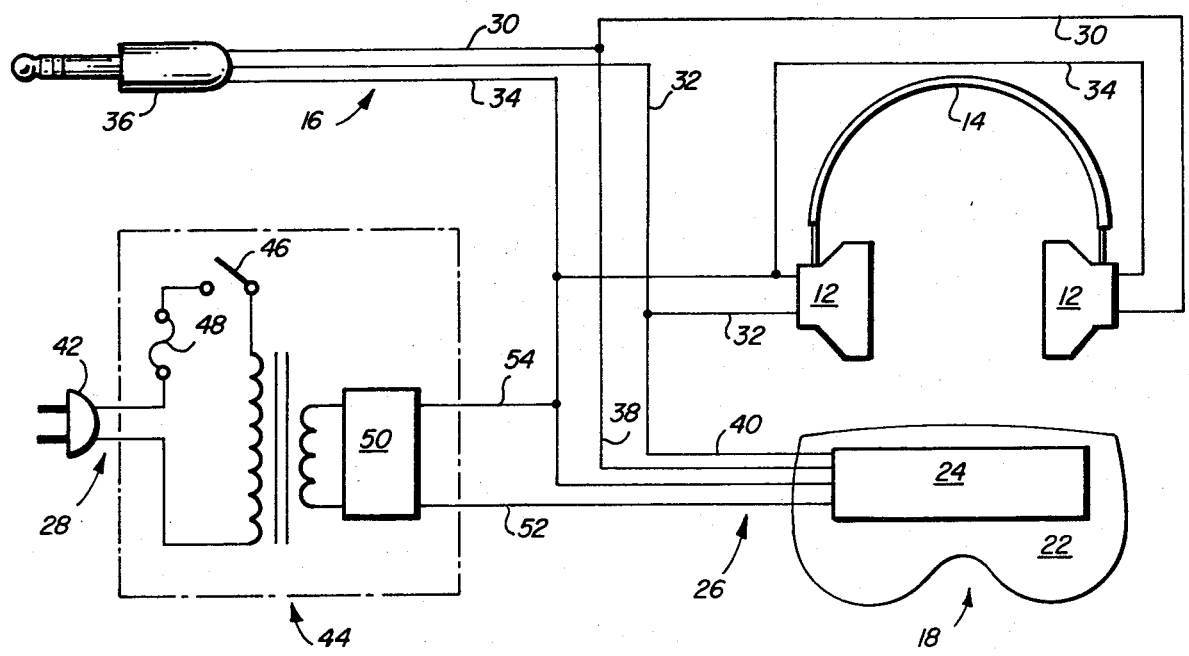
FIG. 2 is a schematic diagram illustrating the general circuitry of the invention.

The general circuitry for the invention is shown in FIG. 2. As shown, the conductor cable 16 comprises an audio input signal cable including a left channel lead 30, a right channel lead 32, and a common lead 34, all coupled to a conventional stereo input plug 36. The left and right channel leads 30 and 32 are coupled respectively to separate ones of the headphones 12, with the common lead being coupled to both headphones. In this manner, separate channels of a stereo audio signal are coupled to separate headphones 12 for enjoyment by the individual, all in a well known manner. Moreover, the left and right channel signals are coupled to the electronics module within the housing 24 as by conductors 38 and 40, respectively, forming part of the module conductor cable 26.

The electronics module is powered a regulated voltage taken from a suitable alternating current household supply as by a conventional plug 42. The plug 42 conducts the alternating current supply via the power cord 28 to a voltage transformer 44 including an on-off switch 46 and a protective fuse 48. The transformer 44 includes a core with primary and secondary winding for reducing the voltage level of the household supply to a relatively low and safe level, say about five volts. This low voltage is supplied to a regulator 50 of a suitable construction which converts the voltage to a direct current voltage for supply to the electronics module via a conductor 52 and a common lead 54. Conveniently, these conductors 52 and 54 also form part of the module conductor cable 26, with the common lead 54 being electrically interconnected with the common lead 34 of the audio input cable 16.

Figure 3:
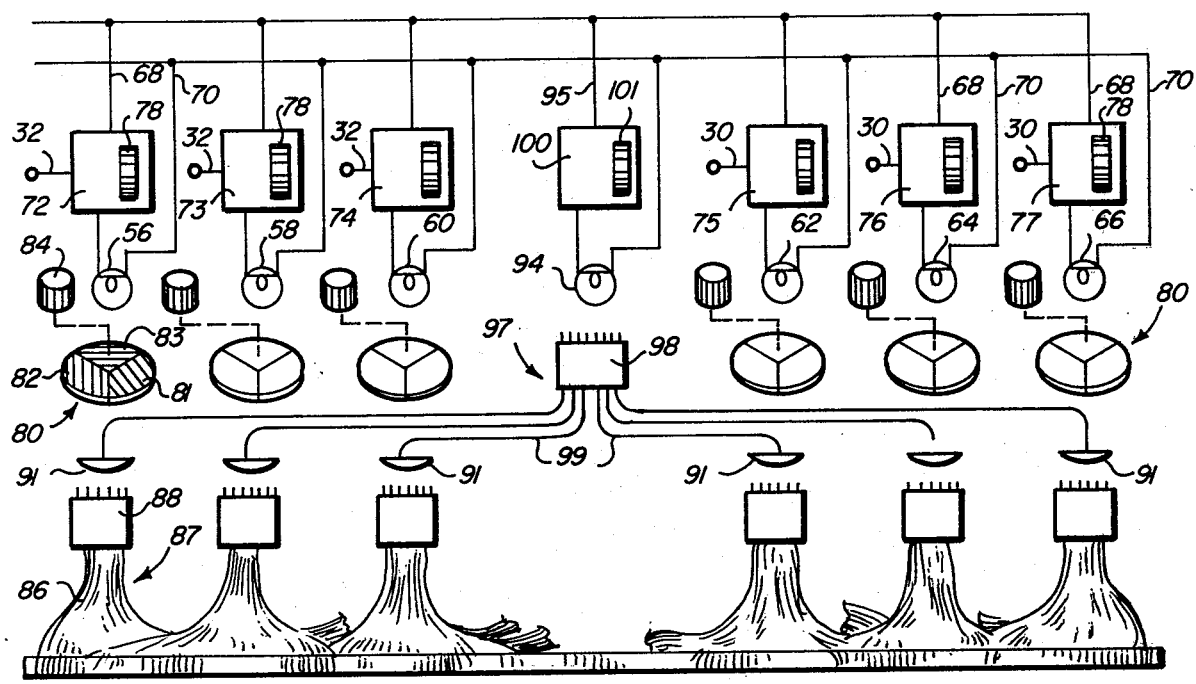
FIG. 3 is a diagram of a portion of the circuitry for the invention.

The electronics module carried within the housing 24 is illustrated schematically in FIG. 3. As shown, a plurality of relatively low voltage incandescent lamps 56, 58, 60, 62, 64, and 66 are each electrically coupled to the five volt direct current supply conductor 52 by means of a lead 68, and to the common lead 54 by means of a lead 70. These lamps 56–66 are controllably illuminated respectively in accordance with the adjustment settings of electronic bandpass filters 72, 73, 74, 75, 76, and 77 each coupled into the leads 68. More specifically, each lamp 56–66 is controlled by one of the bandpass filters 72–77 comprising a signal frequency discriminator functioning in the circuit to turn the lamps 56–66 on and off.

As shown in FIG. 3, the six lamps 56–66 are grouped into two sets with three lamps per set. The lamps 62, 64, and 66 are associated with the left channel audio signal, and have their respective bandpass filters 75, 76, and 77 driven by the left channel audio signal via the conductor 30. In practice, the filters 75, 76, and 77 respectively comprise low, mid-range, and high frequency bandpass filters whereby the frequency composition of the left channel audio signal controls on and off flashing of the lamps 62, 64, and 66. The bandpass filters 75, 76, and 77 are all conventional in form and well known in the art, and thus are not shown or described in detail. Moreover, the filters 75, 76, and 77 each preferably include rotatable thumbwheel controls 78 for allowing intensity adjustment of the lamps 62, 64, and 66.

The remaining three lamps 56, 58, and 60 are associated with the right channel audio signal, and have their respective bandpass filters 72, 73, and 74 driven by the right channel signal via the conductor 32. Similar to the left channel filters 75–77, these right channel filters 72, 73, and 74 respectively comprise low, mid-range, and high frequency bandpass filters for controlling on and off flashing of the lamps 56, 58, and 60 in response to the frequency composition of the right channel signal. Again, these filters 72, 73, and 74 each include a thumbwheel control 78 for allowing intensity adjustment of the associated lamp, with specific filter circuitry being conventional in form and thus not shown or described in detail.

Each of the lamps 56–66 is individually associated with a color wheel 80 including red, green, and blue transparent sections 81, 82, and 83, respectively. Each color wheel 80 is rotatable with respect to its associated lamp by means of a control knob 84 whereby one of the three transparent sections may be positioned to pass light emanating from the lamp. In operation, the color wheels 80 may be adjusted so that the lamps 56 and 62 are associated with red sections 81, the lamps 58 and 64 are associated with green sections 82, and the lamps 60 and 66 are associated with blue sections 83. Alternately, the color wheels 80 may be adjusted for any other desired combination of frequency-color association.

Light passing through each of the color wheels 80 is incident upon the adjacent ends of a plurality of fiber optic strands 86 carried in a bundle 87 and positioned by a clamp 88. That is, a plurality of bundles 87 of strands 86 are provided, with each bundle 87 being associated with one of the lamps 56–66 for receiving and transmitting light emanating therefrom. From the clamps 88, the strands 86 extend toward and have their opposite ends secured to a video display panel 90 carried in the visor 22 described with reference to FIG. 1. As illustrated in FIG. 3, the fiber optic strands 86 associated with the left channel lamps 62, 64, and 66 are relatively randomly distributed over generally one portion or half of the display panel 90, while the strands associated with the right channel lamps 56, 58, and 60 are relatively randomly distributed over the other half of the panel 90. All of the strands are received through relatively small openings 92 for providing a substantially point light source thereon, and may be secured in position as by a suitable adhesive or the like. Importantly, the display panel 90 thus presents a multi-colored video display of varying intensities which corresponds with an audio output simultaneously provided over the headphones 12.

In some applications of the invention, it has been found desirable to provide some background illumination to the display panel 90, and thereby prevent the display from becoming totally dark during interruptions or pauses in the audio signal. In this regard, an additional lamp 94 is coupled as by leads 95 and 96 to the power and common conductors 52 and 54, and provides white light for direction toward an additional fiber optics bundle 97 carried in a clamp 98. The strands 99 of the bundle 97 respectively illuminate one of the other bundles 87, via a lens 91 as necessary, for subsequent illumination of the display panel uniformly over the entire surface thereof. In this manner, continuous white background lighting may be supplied to the panel 90 at all times. Conveniently, the intensity of this background lighting may be controlled by means of an adjustable resistor 100 including a control wheel 101 coupled into the power lead 95, or by other suitable intensity control means such as gradient density filters or the like.

Figure 4:
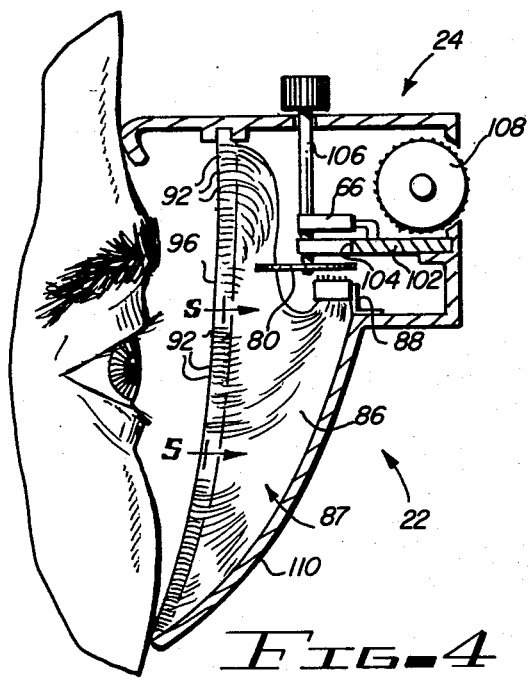
FIG. 4 is an enlarged fragmented section of a portion of the invention taken on the line 4—4 of FIG. 1.
Figure 5:
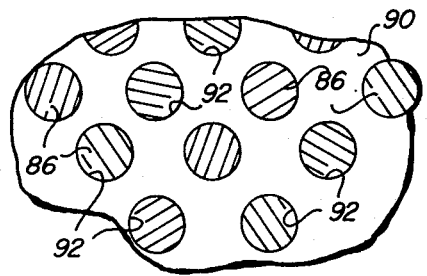
FIG. 5 is a fragmented portion of the invention taken on the line 5—5 of FIG. 4.

The physical arrangement of the lamps and the fiber optics strands 86 in the visor 22 is shown in FIGS. 4 and 5. While only the lamp 66 is shown, the mounting arrangement of the remaining lamps is identical. As shown, the lamp 66 is mounted on a printed circuit board 102 within the module housing 24 which also carries thereon the electronics circuitry shown in FIG. 3. The lamp 66 is arranged with respect to a slot 104 in the board 102 to illuminate downwardly through the associated color wheel 80. The color wheel 80 is carried on a shaft 106 rotatable by means of the control knob 84 on top of the housing 24 to select the desired color section 81, 82, or 83 for passage of the light. The intensity of the light emanating from the lamp 66 may be adjusted by means of the thumb wheel control 78 accessible through a slot 108 in the front of the housing.

Light passing through the color wheel 80 is incident upon the bundle 87 of fiber optic strands 86 carried within the clamp 88. From the clamp 88, the strands 86 are randomly distributed over the surface area of the video display panel 90 for providing a plurality of substantially point light sources visible by the individual. Conveniently, an outer opaque panel 110 extends from the lower end of the housing 24 for connection to the lower end of the display panel 90 to enclose and protect the fiber optic strands 86.

In the preferred embodiment, it has been found that thirty-two fiber optic strands in each bundle 87 provides the video display panel with a multiplicity of point light sources varying in color and intensity in accordance with the audio signal. This multiplicity of point sources provides a pleasing, entertaining display of lights and colors for the individual's enjoyment. The pleasing appearance of this display is substantially enhanced by virtue of its close-coupled relation to the viewer's eyes, normally about two inches or less. That is, it has been found that the human eye is incapable of maintaining a sharp focus upon the display for more than a few seconds at the close-coupled distance involved. As the eye relaxes the focus, the varying color patterns of changing intensities become substantially enhanced in an artistically pleasing and entertaining manner. Further, because of the above-described advantages related to close-coupling and thus non-focusing of the eye on the video display, relatively low power lighting can be utilized to further enhance the safety and economic cost of the invention. This also additionally permits use of inexpensive lighting arrangements which need not even be particularly energy efficient in light transmittal, thus furthering economic manufacture.

Figure 6:
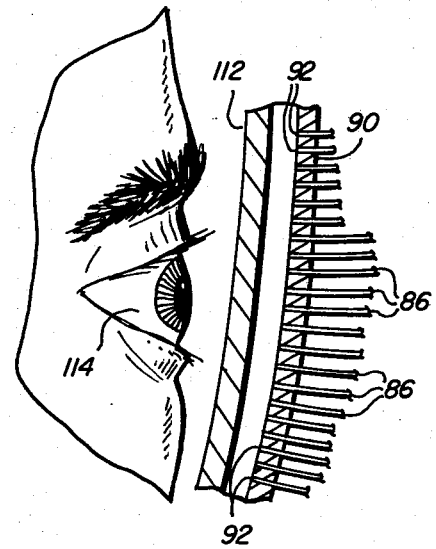
FIG. 6 is a schematic representation of an alternate embodiment of the invention.

One possible modification of the invention is illustrated in FIG. 6. As shown, fiber optic strands 86 transmit light to a video display panel 90, all in the manner described with respect to the previous embodiment. However, as shown, a diffusion panel 112 is interposed between the display panel 90 and the individual's eye 114 whereby the diffusion panel 112 functions to spread out and diffuse light transmitted via the strands 86 to provide a somewhat softer video display effect. In practice, the diffusion panel 112 comprises a sheet of white translucent plastic positioned in front of the display panel 90, say by about 0.25 inch.

Figure 7:
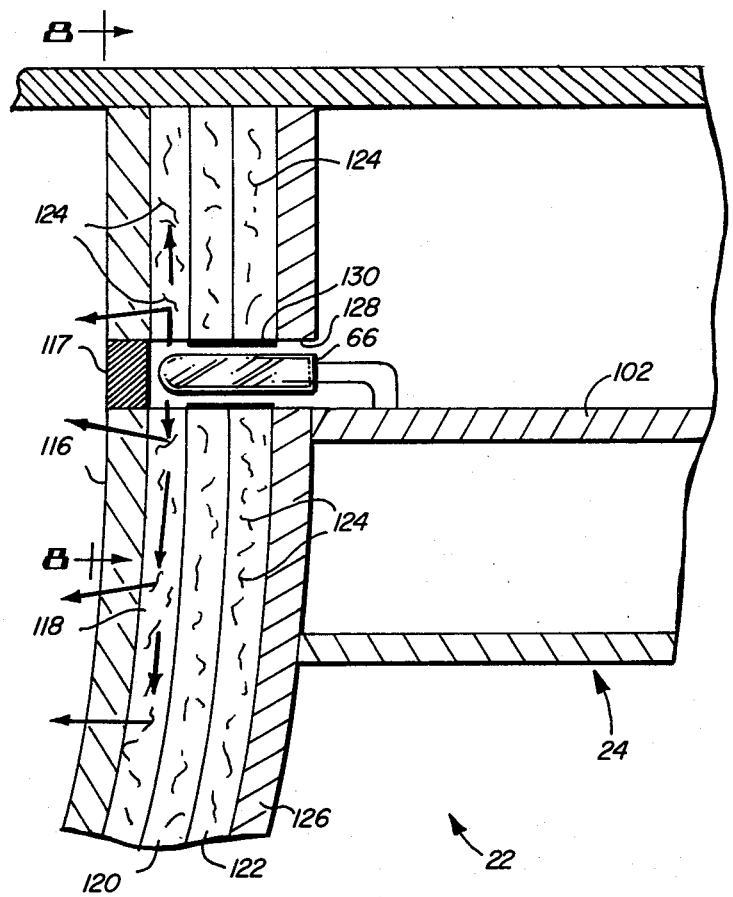
FIG. 7 is an enlarged fragmented section similar to FIG. 4 illustrating another embodiment of the invention.
Figure 8:
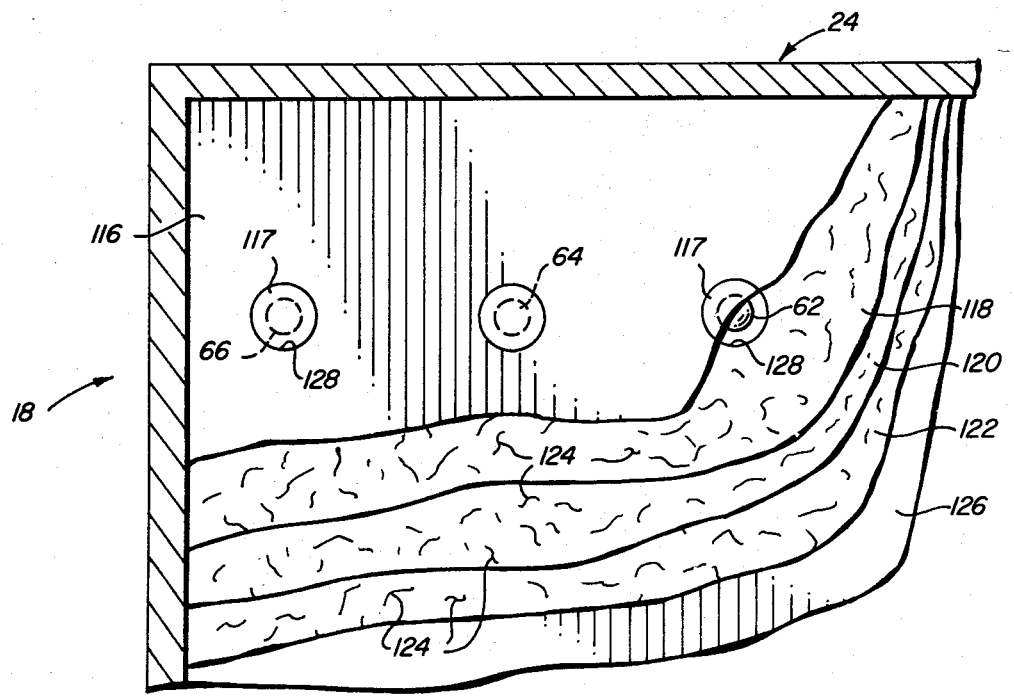
FIG. 8 is a fragmented portion of the embodiment of FIG. 7 taken on the line 8—8 of FIG. 7.

Still another embodiment of the invention is illustrated in FIGS. 7 and 8, and includes a composite assembly of nested, light transmitting sheets forming the visor 22. More specifically, the embodiment includes a plurality of lamps, with the lamp 66 being shown in detail in FIG. 7, which are controllably activated by the frequency responsive bandpass filters (not known), all as set forth in the previous embodiment. However, the lamp 66 comprises a colored lamp thereby eliminating the color wheel and associated control, with different colored lamps being associated with different frequencies.

The visor assembly 18 shown in FIGS. 7 and 8 comprises a translucent inner layer 116, with the exception of opaqued areas 117 in direct alignment with lamps 62, 64, 66, forming a video display panel in close proximity with the individual's eyes. The inner layer 116 is formed from a suitable plastic or the like, and receives light transmitted through three nested intermediate layers 118, 120, and 122. Importantly, these intermediate layers 118, 120, and 122 are formed from a suitable clear plastic material, such as styrene, and include over their surface areas a plurality of randomly oriented fractured traces 124. Alternately, instead of the fractured traces 124, the layers 110, 120, and 122 may include other internal optical occlusions such as small bits of a different plastic material for locally altering the refractive index of the layer wherever the occlusions occur. Finally, the visor 22 includes an outer opaque layer 126 providing a protective sheet for the remaining layers, and providing a mounting surface for the electronics module housing 24.

The lamp 66 mounted on the circuit board 102 is received into an opening 128 formed in the outer opaque layer 126 and the three intermediate layers 110, 120, and 122. As shown in FIG. 7, the lamp 66 is oriented to transmit light to the edges of the intermediate layers 118, 120, and 122, and thereby edge-illuminate these layers. In this manner, light is received by the layers 118, 120, and 122, and appears to the viewer as a pattern of colored light appearing along the fractured traces 124. Importantly, since lamps of three different colors are associated with each audio channel, the colored lamps are associated with individual ones of the intermediate layers 110, 120, and 122. In this regard, the lamp 66 is oriented to transmit light to the layer 118, with the remaining two lamps 120 and 122 being masked by a suitable masking material 130 or other suitable opaque coating, at the opening 128 for lamp 66.

Thus, as illustrated in FIGS. 7 and 8, the intermediate layers 118, 120, and 122 are respectively edge-illuminated with different lamps associated with different colors. This causes each of the layers 118, 120, and 122 to transmit a video display to the inner display panel 116 for viewing. The composite display seen by the viewer comprises a relatively random array of varying colors and intensities synchronized with the audio signal supplied to the headphones.

A certain amount of "cross-talk," i.e., illumination of one layer 118, 120, 122 by another, and/or illumination of the left-side of the display by the right-side lights and vice-versa, can be expected. Such is not necessarily detrimental and in certain instances can be found to enhance the resulting display. Such cross-talk is a function of, and can be reduced by, utilization of material for the illumination layers which have greater and greater total internal reflection surfaces. Cross-talk between the right and left sides of the display can be reduced by placement of an opaque vertical barrier in the layers to separate the right and left sides.

A variety of further modifications and improvements are believed to be possible without varying from the scope or spirit of the invention described herein. For example, the invention may be employed with virtually any audio signal, such as voice recordings, to provide a unique visual output corresponding with the audio signal. Moreover, with reference to FIG. 3, any number of lamps and colors may be associated with each channel as desired, or the channel differentiation may be eliminated to provide a mixed non-stereo output. Still further, background illumination for the unit may be provided without the separate background lamp 94, as by coupling an additional conductor including a relatively large resistor in parallel with each of the conductor leads 68. In this manner, the plurality of lamps will remain partially "on" without triggering the bandpass filters with the audio signal. Accordingly, since these and other modifications and variations are contemplated, no limitation of the invention is intended except by way of the appended claims.

I claim:

1. An audio-visual system for personalized use by an individual, comprising audio means for receiving an audio input signal, and for transforming said signal to an audio output audible to the individual; and a visor assembly for reception in close-coupled relation with the individual's face for substantially completely covering the individual's vision, said visor assembly including a visual display panel visible to the individual, means for receiving the audio signal and for transforming the same to a visual output of varying color and intensity patterns correlated with said audio output, and means for transmitting said visual output for display on said visual display panel, said visual display panel being located in sufficiently close coupled relationship to the individual's eyes to substantially prevent focusing of the eyes on said visual output.

2. The system of claim 1 wherein said audio means comprises at least one headphone for receiving the audio signal, and including means for mounting the headphone over the individual's ear.

3. The system of claim 2 wherein said visor assembly is coupled to said headphone for substantially completely blocking the individual's vision when said headphone is received over the individual's ear.

4. The system of claim 1 wherein said visor assembly includes a translucent panel adjacent the individual's face.

5. The system of claim 1 wherein said visual display panel is positioned less than about two inches from the individual's face.

6. An audio-visual system for personalized use by an individual, comprising audio means for receiving an audio input signal, and for transforming said signal to an audio output audible to the individual; and a visor assembly for reception in close-coupled relation with the individual's face for substantially completely covering the individual's vision, said visor assembly including a visual display panel visible to the individual, means for receiving the audio signal and for transforming the same to a visual output of varying color and intensity patterns correlated with said audio output, and means for transmitting said visual output for display on said visual display panel, said visor assembly comprising an electronics module for receiving the audio signal and for transforming the same to said visual output, and a visor including said visual display panel.

7. The system of claim 6 wherein said electronics module is carried within a housing mounted on said visor.

8. The system of claim 6 wherein said electronics module comprises a plurality of relatively low voltage lamps coupled to a power source, and frequency sensitive filter means electrically coupled to said lamps, said filter means being coupled to the audio signal for energization of said lamps in accordance with the audio signal frequency composition.

9. The system of claim 8 wherein said lamps comprise lamps of various colors corresponding with different frequency ranges of said filter means.

10. The system of claim 8 including color wheels respectively associated with said lamps, said color wheels including a plurality of transparent sections of different colors for selective coloration of light emanating from said lamps.

11. The system of claim 6 wherein said means for transmitting said visual output for display on said display panel comprises a plurality of bundles of fiber optic strands associated with respective ones of said lamps, each bundle having its strands positioned for end-illumination of one end by light emanating from the associated lamp, and having the other ends of the strands received through relatively small openings in the visual display panel in a relatively random distribution to provide a plurality of substantially point light sources on said panel varying in correlation with the audio signal.

12. An audio-visual system for personalized use by an individual, comprising audio means for receiving an audio input signal, and for transforming said signal to an audio output audible to the individual; and a visor assembly for reception in close-coupled relation with the individual's face for substantially completely covering the individual's vision, said visor assembly including a visual display panel visible to the individual, means for receiving the audio signal and for transforming the same to a visual output of varying color and intensity patterns correlated with said audio output, and means for transmitting said visual output for display on said visual display panel, said visor assembly comprising an electronics module for receiving the audio signal and for transforming the same to said visual output, and a visor including said visual display panel, said electronics module comprising a plurality of relatively low voltage lamps operably coupled to a power source and said transforming means, said visual display panel comprising a plurality of relatively transparent panels nested together and including a relatively random distribution of optical occlusions, said lamps being arranged for edge-illuminating said panels whereby the visual output appears as a pattern of light appearing along the optical occulsions.

13. An audio-visual system for personalized use by an individual, comprising audio means for receiving an input signal, and for transforming said signal to an audio output audible to the individual; and a visor assembly for reception in close-coupled relation with the individual's face for substantially completely covering the individual's vision, said visor assembly including a visual display panel visible to the individual, means for receiving the audio signal and for transforming the same to a visual output of varying color and intensity patterns correlated with said audio output, means for transmitting said visual output for display on said visual display panel, and means for providing a background illumination visual output to said display panel independent of said visual output corresponding to the audio signal.

14. An audio-visual system for personalized use by an individual, comprising at least one audio headphone for receiving an audio input signal and for supplying an audio signal output audible to the individual; and a visor assembly coupled to said headphone for close-coupling over the individual's face for substantially completely covering the individual's vision, said visor assembly including a plurality of relatively low voltage lamps coupled to a power source, frequency sensitive filter means for receiving the audio signal and for selectively energizing various ones of said lamps in response to the frequency composition of said audio signal to provide an audio-correlated visual output, means for controlling the coloration of light emanating from each of said lamps, and a visual display panel visible to the individual for receiving and displaying said audio-correlated visual output, said visual display panel being located in sufficiently close-coupled relationship to the individual's eyes to substantially prevent focusing of the eyes on said audio-correlated visual output.

15. The system of claim 14 including fiber optic strands extending between said lamps and said visual display panel for transmitting the visual output to said display panel, said strands being received through relatively small openings formed in said panel to provide a plurality of substantially point light sources on said panel varying in correlation with the audio signal.

16. The system of claim 14 including means for providing a background illumination visual output to said display panel independent of said audio-correlated output.

17. The system of claim 14 wherein said visual display panel is positioned less than about two inches from the individual's face.

18. An audio-visual system for personalized use by an individual, comprising at least one audio headphone for receiving an audio input signal and for supplying an audio signal output audible to the individual; and a visor assembly coupled to said headphone for close-coupling over the individual's face for substantially completely covering the individual's vision, said visor assembly including a plurality of relatively low voltage lamps coupled to a power source, frequency sensitive filter means for receiving the audio signal and for selectively energizing various ones of said lamps in response to the frequency composition of said audio signal to provide an audio-correlated visual output, means for controlling the coloration of light emanating from each of said lamps, and a visual display panel visible to the individual for receiving and displaying the visual output, said visual display panel comprising a plurality of relatively transparent panels nested together and including a relatively random distribution of optical occlusions, and lamps being arranged for edge-illuminating said panels whereby the visual output appears as a pattern of light appearing along the optical occlusions.

19. The system of claim 18 wherein said visor assembly is coupled to said headphone for substantially completely blocking the individual's vision when said headphone is received over the individual's ear, and for positioning said visual display panel in sufficiently close-coupled relationship to the individual's eyes to substantially prevent focusing of the eyes on the visual display.

20. The system of claim 18 wherein said lamps comprise lamps of various colors corresponding with different frequency ranges of said filter means.

21. The system of claim 18 including color wheels respectively associated with said lamps, said color wheels including a plurality of transparent sections of different colors for selective coloration of light emanating from said lamps.

22. The system of claim 18 including means for providing a background illumination visual output to said display panel independent of said visual output corresponding to the audio signal.

23. The system of claim 18 wherein said visual display panel is positioned less than about two inches from the individual's face.

24. The system of claim 18 comprising pair of headphones receiving different audio signals, said lamps and filter means being divided into a pair of sets for receiving said different audio signals and for providing a corresponding pair of visual outputs, said visual display panel being divided generally into two halves for respectively receiving and displaying the pair of visual outputs.

25. An audio-visual system for personalized use by an individual, comprising a pair of headphones, a headband carrying said headphones for positioning over the individual's ears; means for supplying audio signals to said headphones for providing an output audible to the individual; and a visor assembly coupled to said headphones for close-coupling over the individual's face for substantially completely covering the individual's vision, said visor assembly including a plurality of relatively low voltage lamps coupled to a power source, frequency responsive filter means for receiving the audio signals and for selectively energizing various ones of said lamps in response to the frequency composition of said audio signals to provide an audio-correlated visual output, and a visual display panel visible to the individual for receiving and displaying said visual output, said pair of headphones receiving different audio signals, said lamps and filter means being divided into a pair of sets for respectively receiving said different audio signals for providing said visual output as a pair of visual outputs respectively correlated to said different audio signals, said visual display panel being divided generally into two halves for respectively receiving and displaying said pair of visual outputs.

26. The system of claim 19 wherein said pair of headphones receive different audio signals, said lamps and filter means being divided into a pair of sets for receiving said signals for providing simultaneously a pair of video outputs, said video display panel being divided generally into two halves for respectively receiving and displaying the pair of video outputs.

* * * * *

UNITED STATES PATENT AND TRADEMARK OFFICE
CERTIFICATE OF CORRECTION

PATENT NO. : 4,257,062
DATED : March 17, 1981
INVENTOR(S) : Russell W. Meredith

It is certified that error appears in the above-identified patent and that said Letters Patent are hereby corrected as shown below:

COLUMN 8, LINE 33, read "claim 6" as -- Claim 8--.

COLUMN 10, delete lines 60-66 (Claim 26).

On the title page "26 Claims" should read -- 25 Claims --.

Signed and Sealed this

Sixteenth Day of June 1981

[SEAL]

Attest:

RENE D. TEGTMEYER

Attesting Officer

Acting Commissioner of Patents and Trademarks